(12) United States Patent
Yoon et al.

(10) Patent No.: US 10,901,217 B1
(45) Date of Patent: Jan. 26, 2021

(54) COMPACT WIDE FIELD OF VIEW DISPLAY ASSEMBLY FOR ARTIFICIAL REALITY HEADSETS

(71) Applicant: Facebook Technologies, LLC, Menlo Park, CA (US)

(72) Inventors: Youngshik Yoon, Cupertino, CA (US); Min Hyuk Choi, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 47 days.

(21) Appl. No.: 16/240,477

(22) Filed: Jan. 4, 2019

(51) Int. Cl.
*G02B 27/01* (2006.01)
*G02B 5/30* (2006.01)

(52) U.S. Cl.
CPC ....... *G02B 27/0172* (2013.01); *G02B 5/3058* (2013.01); *G02B 2027/0123* (2013.01); *G02B 2027/0178* (2013.01)

(58) Field of Classification Search
CPC .............. G02B 27/0172; G02B 5/3058; G02B 2027/0123; G02B 2027/0178
See application file for complete search history.

(56) References Cited

U.S. PATENT DOCUMENTS

2020/0195912 A1\* 6/2020 Smith ................ G02B 27/0176

\* cited by examiner

*Primary Examiner* — Wen Huang
(74) *Attorney, Agent, or Firm* — Fenwick & West LLP (57) ABSTRACT

A headset includes a compact wide field of view optics block. The headset includes a display element and an optics block. The display element is configured to generate image light. The optics block is configured to direct the image light to an eyebox. The optics block includes a projection lens and a panoramic lens. The projection lens has a first diameter and is adjacent to the display element and is configured to receive the image light from the display element. The panoramic lens is positioned between the projection lens and the eyebox. The panoramic lens has a second diameter that is larger than the first diameter and is configured to provide the image light that has been transmitted by the projection lens to the eyebox.

21 Claims, 8 Drawing Sheets

COMPACT WIDE FIELD OF VIEW DISPLAY ASSEMBLY FOR ARTIFICIAL REALITY HEADSETS

BACKGROUND

The present disclosure generally relates to headsets, and specifically relates to a compact wide field of view display assemblies for artificial reality headsets.

Head-mounted displays (HMDs) are used to display various media to users. HMDs are designed to show users realistic media displays, such that the media covers the field of view of a user. However, conventional display and lens design for HMDs have limitations in dimension, weight, and efficiency and improvements in one factor generally lead to diminishments in another. As one example, a HMD with a wide field of generally results in a relatively large form factor.

SUMMARY

Described herein are embodiments that relate to a compact wide field of view display assemblies for use in artificial reality headsets. A headset includes a display assembly. The display assembly includes a display element and an optics block. The display element is configured to generate image light. In some embodiments, the display element is a micro display.

The optics block is configured to direct the image light to an eyebox. The optics block includes a projection lens and a panoramic lens. The projection lens is adjacent to the display element and is configured to receive the image light from the display element, the projection lens having a first diameter. The panoramic lens positioned between the projection lens and the eyebox, wherein the panoramic lens has a second diameter that is larger than the first diameter, and is configured to provide the image light that has been transmitted by the projection lens to the eyebox.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described here relate to a compact wide field of view optics block for us in artificial reality headsets ("headset"). A headset may be used to display various media content (e.g., video, virtual objects, images, etc.) to a user as part of an artificial reality system. A headset includes a display assembly that provides content (i.e., image light) to a user of the headset. The display assembly includes a display an optics block. The display includes one or more display elements that are configured to generate image light. In some embodiments, a display element is a micro display. The micro display may have resolution that when viewed through the display assembly is a resolution of at least that of a human eye The optics block is configured to direct the image light to an eyebox. The optics block includes a projection lens and a panoramic lens. The projection lens is adjacent to the display element and is configured to receive the image light from the display element, the projection lens having a first diameter. The panoramic lens positioned between the projection lens and the eyebox, wherein the panoramic lens has a second diameter that is larger than the first diameter, and is configured to provide the image light that has been transmitted by the projection lens to the eyebox.

The display assembly is compact relative to conventional HMDs. Optical systems based on panoramic lenses generally provides wide field of views, and optical systems based on projection lenses generally provides high resolution. The display assembly combines the functionality of these optical systems such that the display assembly is not only relatively compact (i.e., small form factor), but also has a wide field of view and provides high resolution. A projection lens of the display assembly projects light from a display towards a panoramic lens that is designed in order to provide a wide field of view to the user. A wide field of view reduces eye fatigue and helps provide an immersive artificial reality experience to a user of the headset. Moreover, in some embodiments, the optics block may also include a folded optical system which acts to further reduce the form factor of the display assembly.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD or near-eye display (NED) connected to a host computer system, a standalone HMD, a standalone NED, a mobile device or computing system, or any other hardware platform capable of providing artificial reality content to one or more viewers.

Figure 1A:
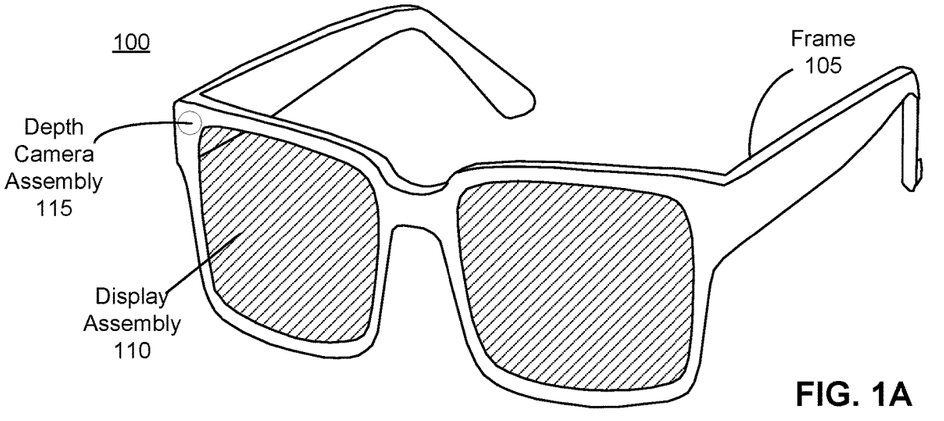
FIG. 1A is a diagram of a headset, in accordance with one or more embodiments.

FIG. 1A is a diagram of a headset 100, in accordance with one or more embodiments. In the illustrated embodiment, the headset 100 is a NED. Note in embodiments not shown the headset 100 may be a head-mounted display (HMD). A HMD is a larger headset that does not have the relatively compact form factor of a NED. The headset 100 presents media to a user. Examples of media presented by the headset 100 include one or more images, video, audio, or some combination thereof. In some embodiments, audio is presented via an external device (e.g., speakers and/or headphones) that receives audio information from the headset 100, a console (not shown), or both, and presents audio data based on the audio information. The headset 100 is configured to operate as an artificial reality headset. For example, the headset 100 may operate as a VR headset, an AR headset, a MR headset, or some combination thereof.

The headset 100 shown in FIG. 1A includes a frame 105, a display assembly 110, and optionally includes one or more depth camera assemblies (DCAs) 115. The frame 105 is coupled to one or more optical elements which together display media to users. In some embodiments, the frame 105 may represent a frame of eye-wear glasses. The display assembly 110 is configured for users to see the content presented by the headset 100. The DCA 115 determines depth information for objects in a local area around the headset 100. The DCA 115 is discussed in detail below with regard to FIG. 6. Note that while the DCA 115 is shown in a particular location on the headset 100, in other embodiments, the DCA 115 may be located elsewhere on the headset 100 and/or may include additional cameras.

Figure 1B:
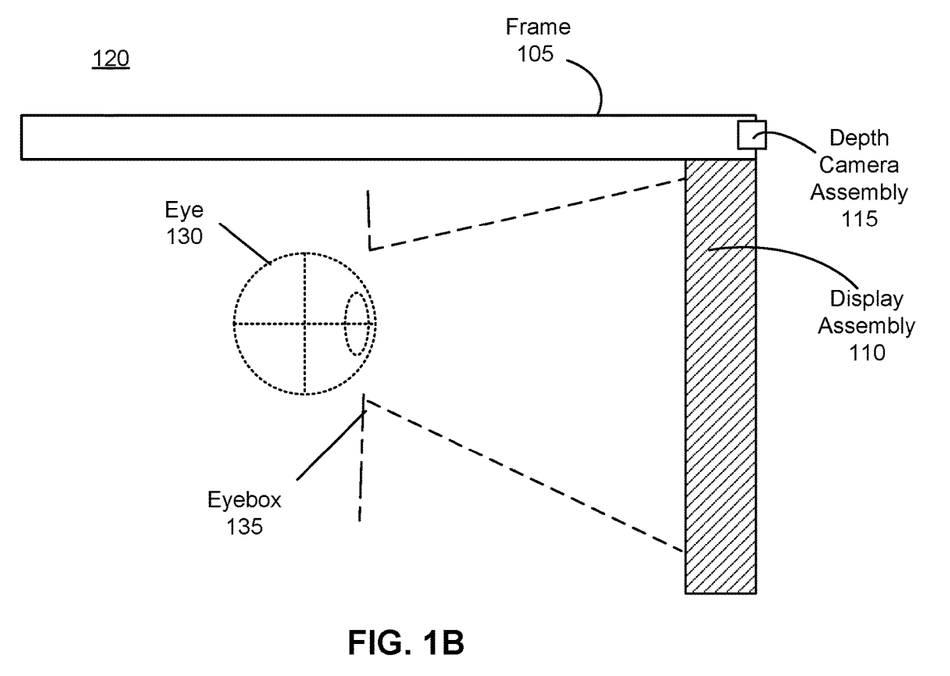
FIG. 1B is a cross-section of the headset illustrated in FIG. 1A, in accordance with one or more embodiments.

FIG. 1B is a cross-section 120 of the headset 100 illustrated in FIG. 1A, in accordance with one or more embodiments. The display assembly 110 presents content to an eye 130 in an eyebox 135. The eyebox 135 is a location where the eye 130 is positioned when the user wears the headset 100. For purposes of illustration, FIG. 1B shows the cross section 120 associated with a single eye 130 and the display assembly 110, but in alternative embodiments not shown, another display assembly which is separate from the display assembly 110 shown in FIG. 1B, provides image light to an eyebox of another eye of the user. The display assembly 110 provides image content (also referred to is image light) to the eyebox 135.

Figure 2:
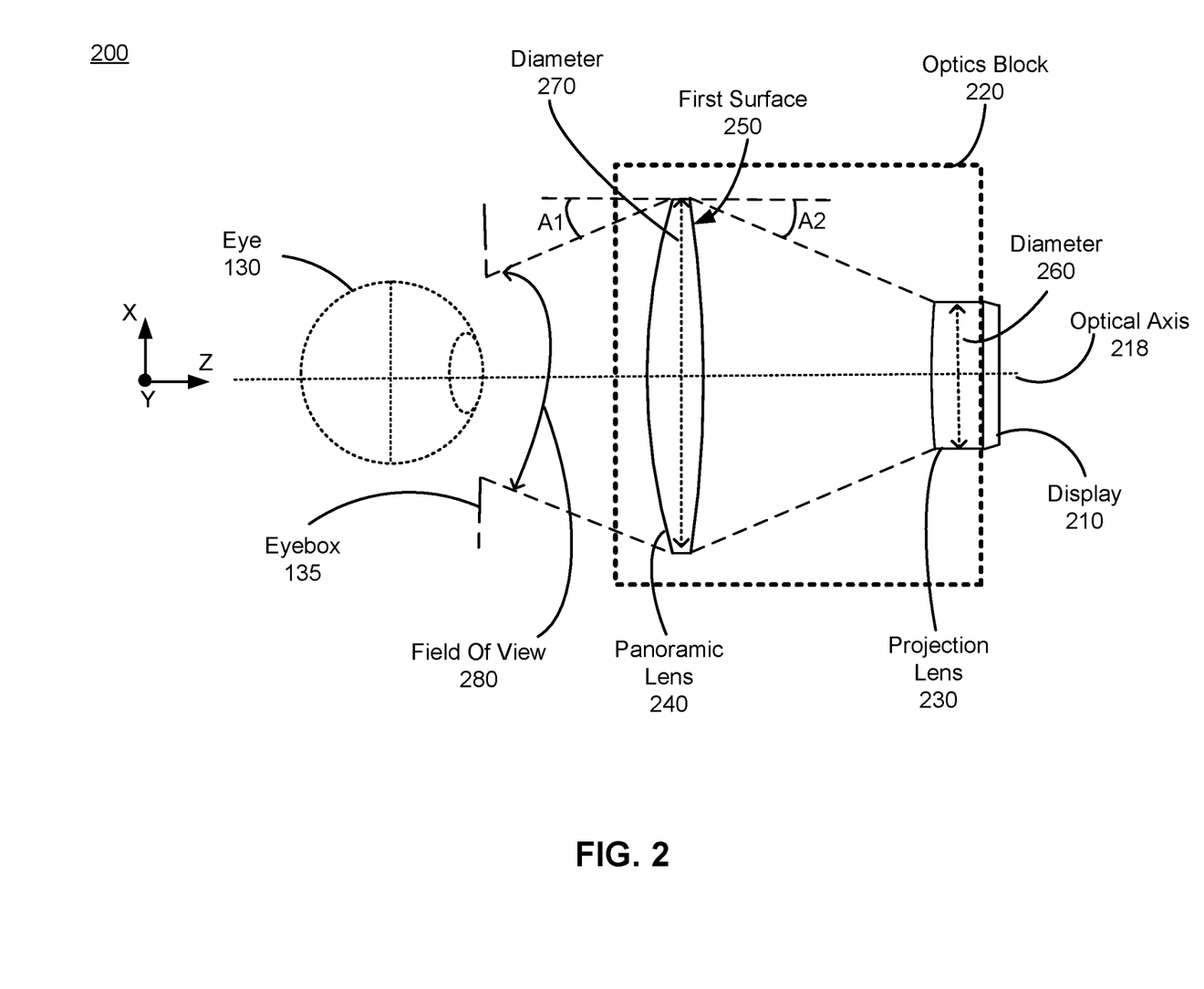
FIG. 2 is an example display assembly, in accordance with one or more embodiments.

FIG. 2 is an example display assembly 200, in accordance with one or more embodiments. The display assembly 200 provides content to the eyebox 135. The display assembly 110 is an embodiment of the display assembly 200. The display assembly 200 may be incorporated into a headset (e.g., the headset 100), a HMD, some other device, or some combination thereof. The display assembly 200 includes a display 210 and an optics block 220.

The display 210 generates image light. The display 210 includes one or more display elements that generate image light. A display element may be, e.g., a liquid crystal display (LCD), an organic light emitting diode (OLED) display, an active-matrix organic light-emitting diode display (AMOLED), a transparent OLED, some other display, or some combination thereof. In some embodiments, a display element may also include a waveguide, a scanning assembly (e.g., a scanning mirror), or some combination thereof. In some embodiments, a display element may be a micro-display. A micro display is a display element that have a small emission area that has a diagonal that is at most 2 inches. In some embodiments, a distance (e.g., along an optical axis 218) from the eyebox 135 to the display 210 (e.g., at least one display element) is no more than 50 mm.

The optics block 220 directs the image light to the eyebox 135. In some embodiments, the optics block 220 magnifies the image light received from the display 210, corrects optical errors associated with the image light, and presents the corrected image light to the eyebox 135. In the illustrated embodiment, the optics block 220 includes a projection lens 230 and a panoramic lens 240.

The projection lens 230 projects image light from the display 210 onto a first surface 250 of the panoramic lens 240. The projection lens 230 is a positive lens that magnifies the image light. The projection lens 230 is compact and smaller than the panoramic lens 240. The projection lens 230 has a diameter 260 that is at least as large as the emission area of the display 210, and may be larger than the emission area of the display 210 (and the display 210). In the illustrated embodiment, the projection lens 230 is directly coupled to the display 210 (e.g., to at least one display element), such that the image light emitted from the emission area of the display is refracted by the projection lens 230 toward the panoramic lens 240. In alternate embodiments, the projection lens 230 is separated from the display 210 by some distance (e.g., several mm).

The panoramic lens 240 provides the image light that has been transmitted by the projection lens 230 to the eyebox 135. The panoramic lens 240 is a positive lens that magnifies the image light. The panoramic lens 240 is large relative to the projection lens 230, and has a diameter 270 that is larger than the diameter 260 of the projection lens 230. The diameter 270 is determined based on the field of view 280 for the display assembly 200. The panoramic lens 240 is positioned between the projection lens 230 and the eyebox 135. The panoramic lens 240 provides image light to the eyebox 135, such that the display assembly 200 has a field of view 280. The field of view 280 is wide enough such that the eye 130 is able to look around within the eyebox 135 without losing the image light. For example, the field of view 280 for the display assembly 200 may be, e.g., at least 70 degrees for the eye 130. Optical power of the panoramic lens 240 is based on magnification that occurs between A1 and A2, and is thereby dependent on the optical power of the projection lens 230 which provide light to the panoramic lens 240. Moreover, a distance between the display 210 and the eyebox 135 is small relative to conventional systems that utilize a single projection lens. Additionally, form factor in directions transverse to the optical axis 218 (e.g., x and y) may also be reduced by using, e.g., a small high-resolution display (e.g., a micro display). Use of the projection lens 230 and the panoramic lens 240, provides a large field of view in a compact form factor.

In some embodiments, the optics block 220 includes one or more additional optical elements. Example optical elements included in the optics block include: reflective linear polarizers, Faraday rotators, partial reflectors, wire grid polarizers, and quarter waveplates. Moreover, the optics block may include combinations of different optical elements. In some embodiments, the optics block may have a folded optical system composed of polarizers, Faraday rotators, reflectors, or waveplates. The folded optical system is positioned between the panoramic lens 240 and the projection lens 230. The folded optical system may reduce a distance (along the optical axis 218) between the projection lens 230 and the panoramic lens 240 by a factor of three. The folded optical system is discussed in detail below with regard to FIGS. 3A-4B.

Figure 3A:
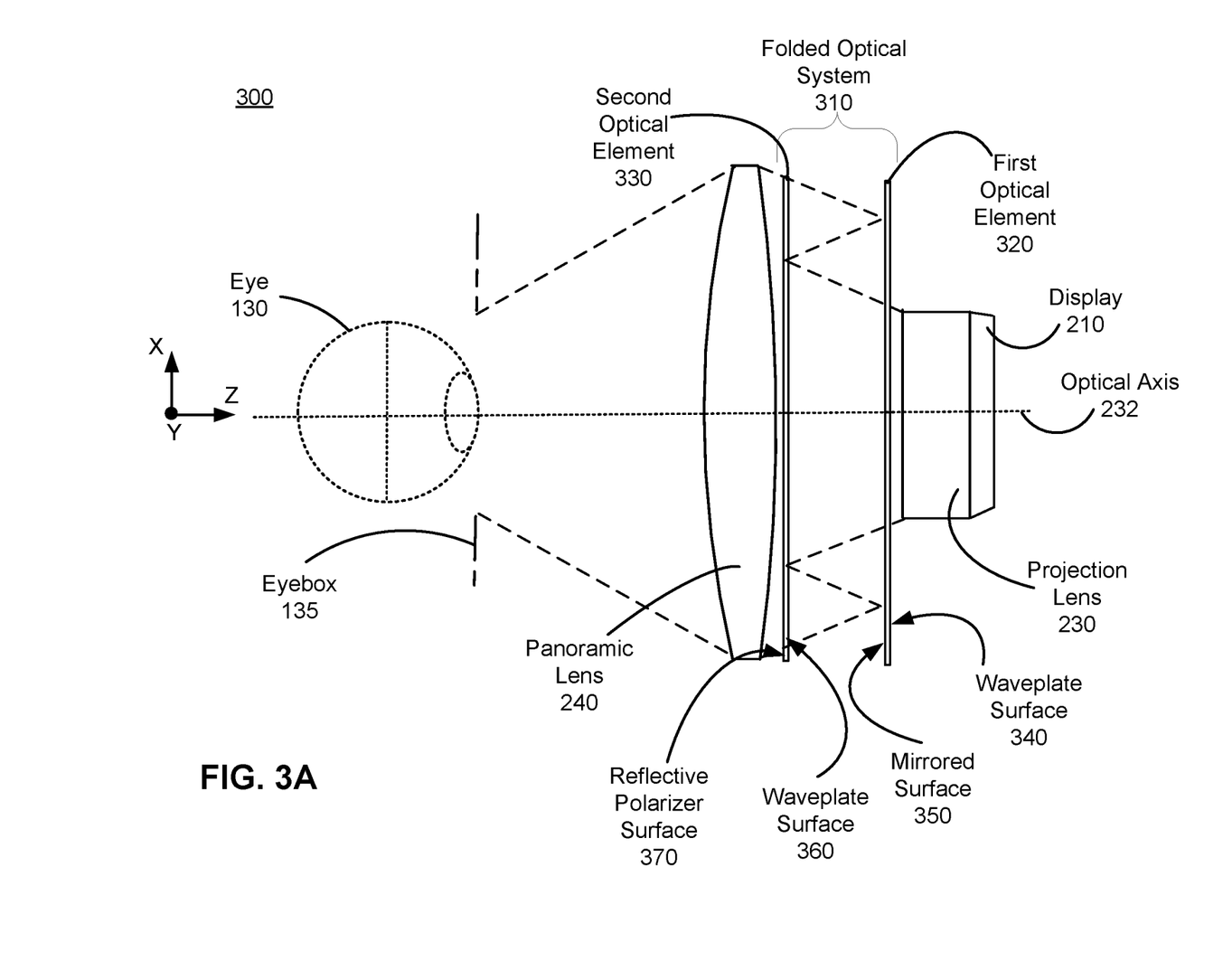
FIG. 3A is an example display assembly that includes a folded optical system, in accordance with one or more embodiments.

FIG. 3A is an example display assembly 300 that includes a folded optical system 310, in accordance with one or more embodiments. The display assembly 300 provides image light to the eyebox 135. The display assembly 300 is substantially the same as the display assembly 200 except that it is modified to include the folded optical system 310.

The folded optical system 310 allows for a reduction in the spacing between the panoramic lens 240 and the projection lens 230 relative to a spacing between those elements in the display assembly 200. In some embodiments, a distance (e.g., along an optical axis 232) from the eyebox 135 to the display 210 is at least 10 mm and at most 25 mm. For example, in some embodiments, the distance (e.g., along the optical axis 232) from the eyebox 135 to the display 210 is no more than 25 mm. The reduced spacing results in the display assembly 300 having a smaller form factor than the display assembly 200.

The folded optical system 310 directs light transmitted from the projection lens 230 to the panoramic lens 240. The folded optical system 310 includes a first optical element 320 and a second optical element 330. Note that the first optical element 320 and the second optical element 330 do not impart optical power to the light (e.g., have substantially flat front and back surfaces). By not imparting optical power, it reduces tolerancing and/or manufacturing requirements that appear if one or more of the first optical element 320 and the second optical element 330 are curved. However, in alternate embodiments (not shown), one or more of the first optical element 320 and the second optical element 330 are curved.

The first optical element 320 includes a waveplate surface 340 and a mirrored surface 350. In this example, the waveplate surface 340 is a quarter-waveplate that shifts polarization of received light. The waveplate surface 340 receives the image light from the projection lens 230. A quarter-waveplate includes a polarization axis and the waveplate surface 340 shifts the polarization axis 45 degrees relative to incident linearly polarized light such that the waveplate surface 340 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. In one embodiment, the quarter-waveplates are designed to be optimized such that the dependence of the retardance induced by the plate remains close to a quarter of a wave independently of the wavelength and the angle of incidence.

The mirrored surface 350 is partially reflective to reflect a portion of the received light. In some embodiments, the mirrored surface 350 is configured to transmit 50% of incident light and reflect 50% of incident light. The mirrored surface is adjacent to the waveplate surface 340.

The second optical element 330 includes a waveplate surface 360 and a reflective polarizer surface 370. The waveplate surface 360 is also a quarter-waveplate. The waveplate surface 360 is closer to the eyebox 135 than the mirrored surface 350. The waveplate surface 360 is substantially the same as the waveplate surface 340.

The reflective polarizer surface 370 is a partially reflective mirror configured to reflect received light of a first linear polarization and transmit received light of a second linear polarization. For example, the reflective polarizer surface 370 may be configured to reflect linearly polarized light with a polarization orientation in the x direction, and pass light with a polarization orientation in the y direction. The operation of the folded optical system 310 is discussed below with regard to FIG. 3B. In the illustrated embodiment, the folded optical system 310 includes a first optical element 320 and a second optical element 330. In some embodiments, the folded optical system 310 includes more than two optical elements, e.g., an optical element for the waveplate surface 340, an optical element for the mirrored surface 350, an optical element for the waveplate surface 360, and optical element for the reflective polarizer surface 370.

Figure 3B:
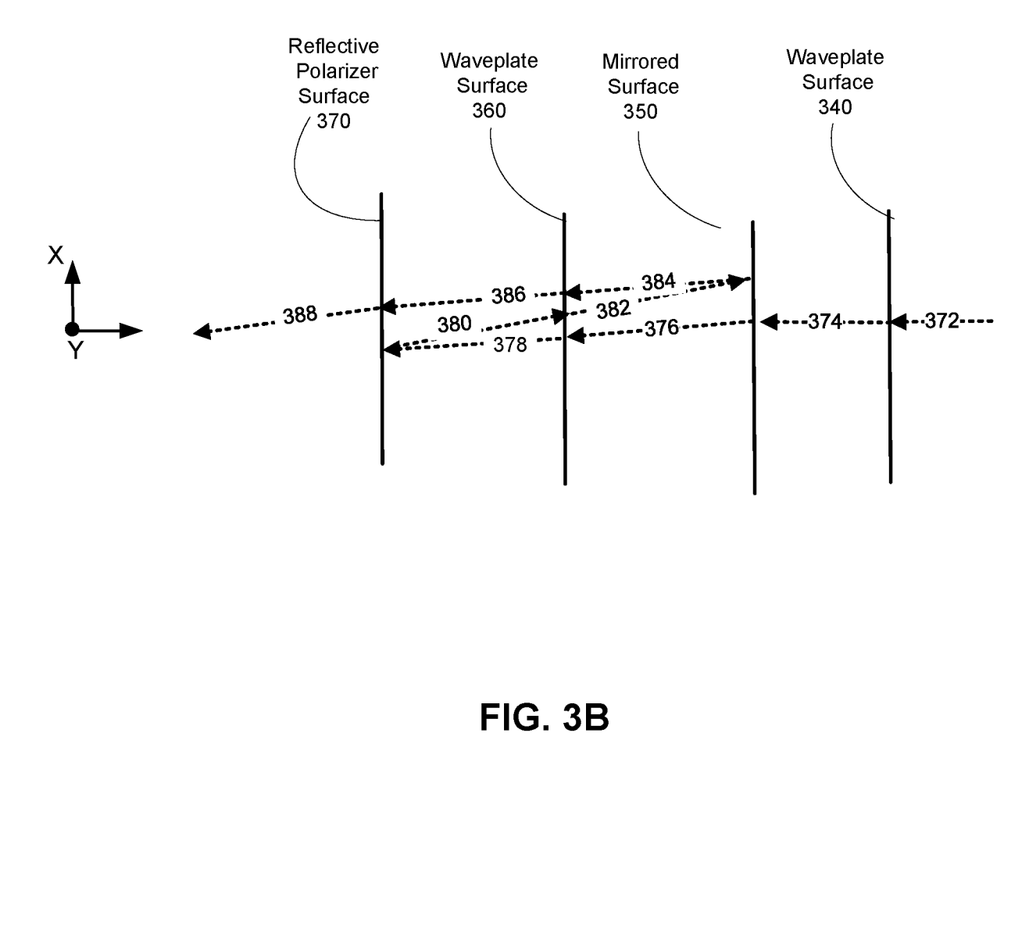
FIG. 3B shows example light propagation in the folded optical system of FIG. 3A, in accordance with one or more embodiments.

FIG. 3B shows example light propagation in the folded optical system 310 of FIG. 3A, in accordance with one or more embodiments. Light 372 is linearly polarized. The light 372 may be polarized by formed by polarizing light from the display 210 and/or the projection lens 230, or may be directly emitted from the display 210. The waveplate surface 340 (quarter-waveplate) has an axis 45 degrees (or 90 degrees) relative to the y direction (which is the direction of polarization of light 372). The orientation of the waveplate axis relative to the incident linearly polarized light controls the handedness of the emitted circularly polarized light. The waveplate surface 340 changes the polarization of light 372 from linear polarization to circular polarization— shown as light 374. The polarization of light 374 may be clockwise or anti-clockwise based on the orientation of the axis of the waveplate surface 340 relative to incident linearly polarized light. A first portion of the light 374 is reflected by the mirrored surface 350, and a second portion of light 376 is transmitted by the mirrored surface 350 towards the waveplate surface 360. In some embodiments, the mirrored surface 350 is configured to reflect 50% of incident light (e.g., the light 374). Similarly, the waveplate surface 360 is a quarter-waveplate and changes the polarization of the light 376 from circular to linear (referred to as light 378).

The light 378 is incident on the reflective polarizer surface 370. The reflective polarizer surface 370 transmits light that is polarized along a transmission orientation (e.g., x direction) and reflects light that has a polarization that has a different orientation. At this point, the light 378 is linearly polarized in a direction that is orthogonal (e.g., the y-direction) to the transmission orientation. Thus, the reflective polarizer surface 370 reflects the light 378 and the reflected light is referred to as light 380. The waveplate surface 360 changes the linear polarized light 380 to circularly polarized light 382 and the mirrored surface 350 reflects a portion of the polarized light 382, as described above. The reflected portion of the light 382 is referred to as light 384.

The light 384 is also circularly polarized; however, its handedness is opposite that of the light 376 due to the reflection from the mirrored surface 350. Thus, the waveplate surface 360 changes the polarization of the circularly polarized light 384 to linearly polarized light 386. However, as the handedness of the light 384 is opposite to that of light 376, the polarization of the light 386 is perpendicular to that of the light 378. Accordingly, the light 386 is linearly polarized in a direction (e.g., x) which is parallel to the transmission orientation of the reflective polarizer surface 370 (and perpendicular to the orientation of the light 378 that was previously reflected), and is therefore transmitted by reflective polarizer surface 370 as light 388 to the panoramic lens 240.

Light propagating through the folded optical system 310, thus, undergoes multiple reflections between the first optical element 320 and the second optical element 330. In general, image light that enters the folded optical system 310 is reflected by the reflective polarizer surface 370 back toward the mirrored surface 350 once before transmitting the image light to the panoramic lens 240. Moreover, orientations of the waveplate surface 340, the waveplate surface 360, the reflective polarizer surface 370 may be different than those described above—so long as at the image light is reflected at least one time within the folded optical system 310 prior to exiting towards the panoramic lens 240. The folded optical system 310 reduces a spacing between the projection lens 230 and the panoramic lens 240, thereby reducing form factor of the display assembly. For example, the folded optical system 310 may reduce a distance (along the optical axis 232) between the projection lens 230 and the panoramic lens 240 by a factor of three relative to a distance between the projection lens 230 and the panoramic lens 230 that is shown in FIG. 2.

Figure 4A:
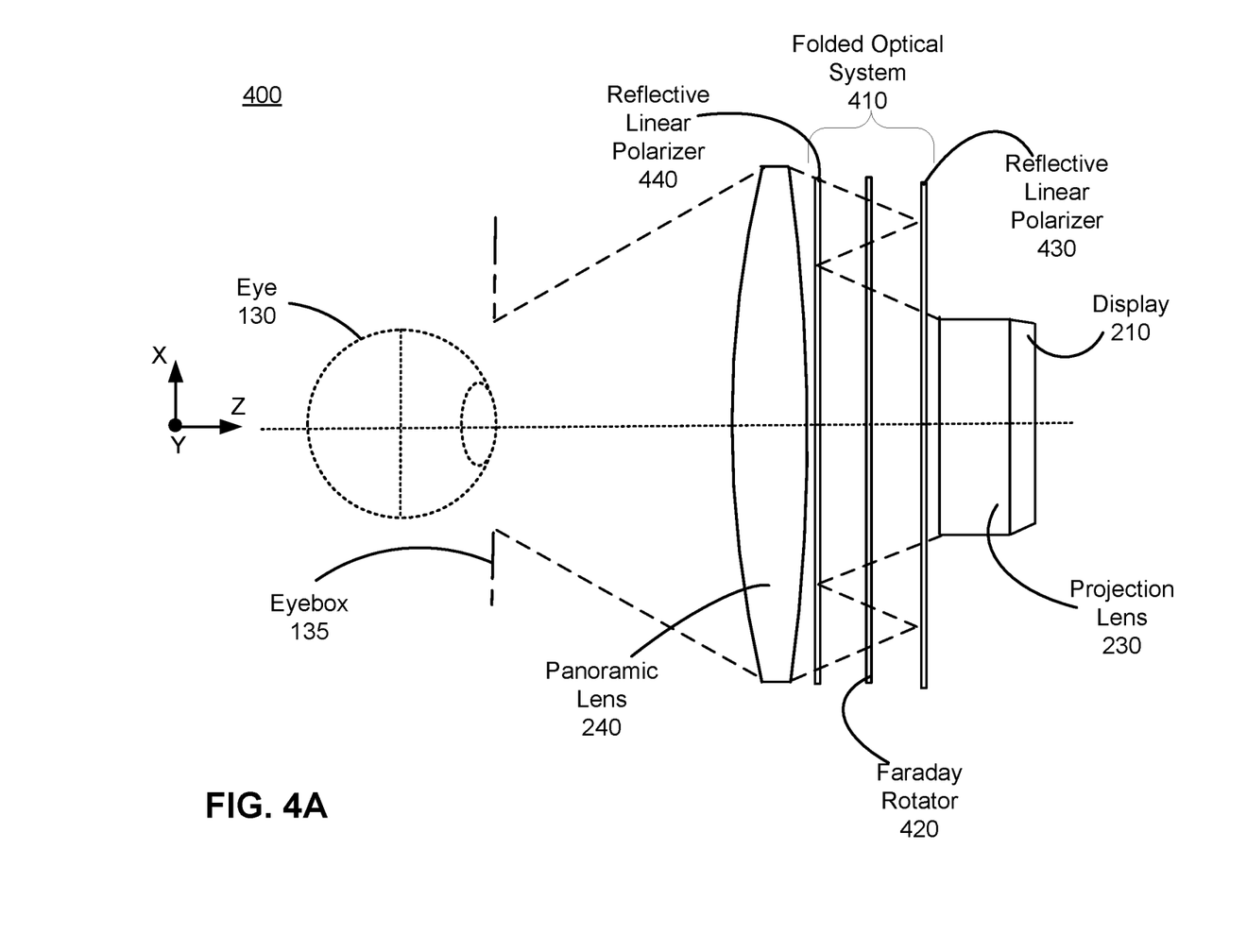
FIG. 4A is an example display assembly that includes a folded optical system that includes a Faraday rotator, in accordance with one or more embodiments.

FIG. 4A is an example display assembly 400 that includes a folded optical system 410 that includes a Faraday rotator 420, in accordance with one or more embodiments. The display assembly 400 provides content to the eyebox 135. The display assembly 400 is substantially the same as the display assembly 200 except that it is modified to include the folded optical system 410.

The folded optical system 410 allows for a reduction in the spacing between the panoramic lens 240 and the projection lens 230 relative to a spacing between those elements in the display assembly 200. The reduced spacing results in the display assembly 400 having a smaller form factor than the display assembly 200.

The folded optical system 410 directs light transmitted from the projection lens 230 to the panoramic lens 240. The folded optical system 310 includes a reflective linear polarizer 430, the Faraday rotator 420, and a reflective linear polarizer 440. Note that the reflective linear polarizer 430, the Faraday rotator 420, and the reflective linear polarizer 440 do not impart optical power to the light (e.g., have substantially flat front and/or back surfaces).

The reflective linear polarizer 430 linearly polarizes light from the projection lens 230. The reflective linear polarizer 430 reflects light that is polarized in a blocking direction (e.g., x direction) and transmits light that is polarized in a transmission direction (e.g., y direction). The reflective linear polarizer 430 may be, e.g., a wire grid polarizer, a thin film polarizer, or some other reflective linear polarizer. The reflective linear polarizer 430 has a transmission orientation which controls an orientation of the transmission direction of light.

The Faraday rotator 420 rotates linear polarized light. The Faraday rotator 420 is a polarization rotator that is based on the Faraday effect. The polarization rotation performed by the Faraday rotator 420 is non-reciprocal in the sense that a polarization rotation (+ΔP) caused by passing through the Faraday rotator 420 is not reversed (i.e., imparting −ΔP) by passing a reflected beam through the Faraday rotator 420. Instead the Faraday rotator 420 imparts an additional rotation in polarization (+ΔP). While the Faraday rotator 420 is shown a separate element, in some embodiments, it may be coupled to one of the reflective linear polarizers 430, 440. The Faraday rotator 420 is configured such that it imparts an additional rotation in polarization of 45 degrees.

The reflective linear polarizer 440 is substantially similar to the reflective linear polarizer 430, however, the reflective linear polarizer 440 is oriented such that its transmission orientation is offset by −45 degrees relative to the transmission orientation of the reflective polarizer 430. In some embodiments, at least one of the reflective linear polarizer 440 and reflective linear polarizer 430 is a wire grid polarizer, and in some cases both are wire grid polarizers. The operation of the folded optical system 410 is discussed below with regard to FIG. 4B.

Figure 4B:
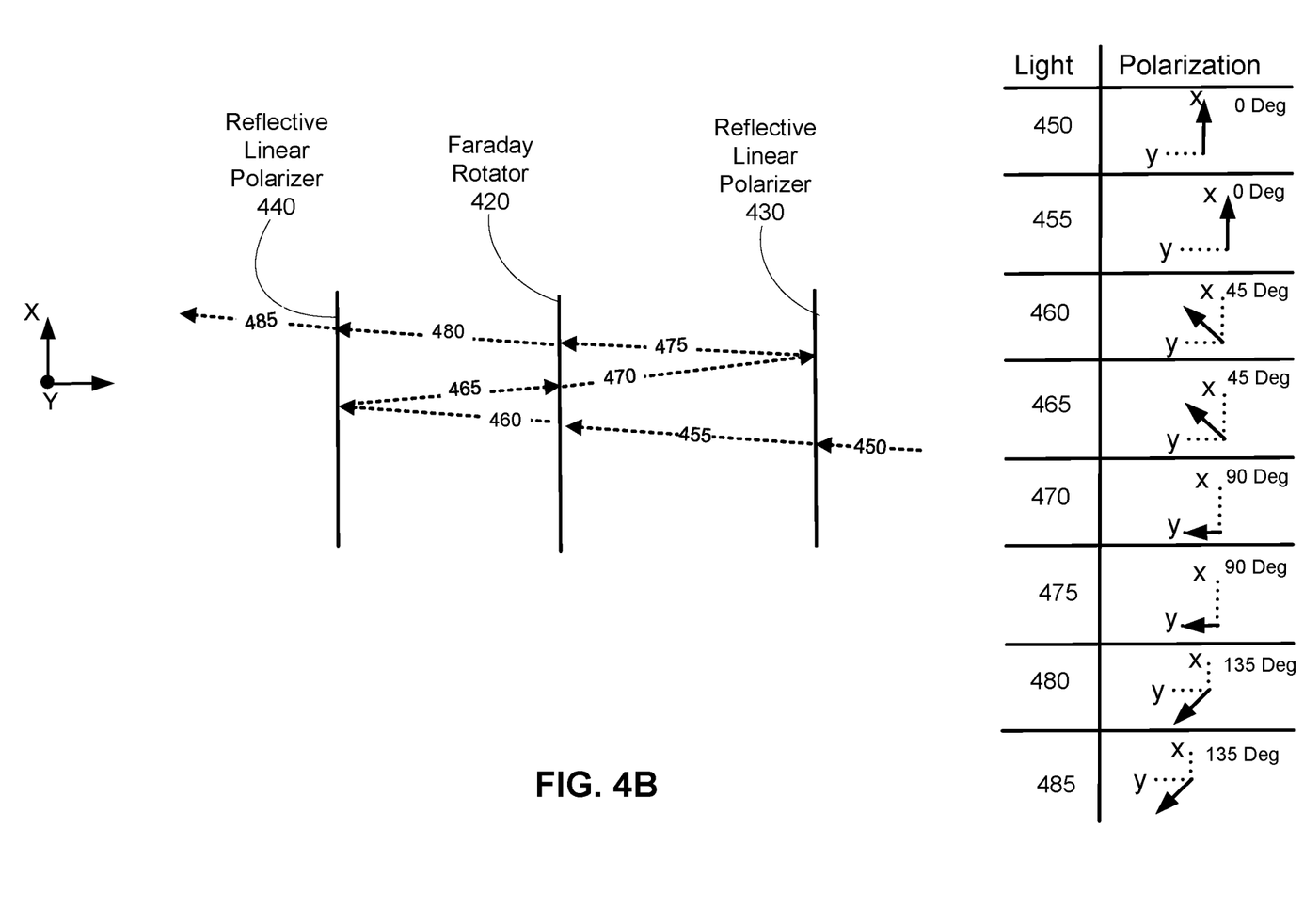
FIG. 4B shows example light propagation in the folded optical system of FIG. 4A, in accordance with one or more embodiments.

FIG. 4B shows example light propagation in the folded optical system 410 of FIG. 4A, in accordance with one or more embodiments. Light 450 is polarized by the reflective linear polarizer 430 to form light 455 that is linear polarized (e.g., parallel to the x-axis). A polarization of the light 455 is rotated by +45 degrees by the Faraday rotator 420 to form light 460.

The light 460 is incident on the reflective linear polarizer 440, which transmits light that is parallel to its transmission orientation, and reflects light that has other orientations. The polarization of the light 460 is orthogonal to the transmission orientation of the reflective linear polarizer 440, and accordingly is reflected as light 465. For example, the transmission orientation of the reflective linear polarizer 440 may be 45 degrees behind that of the transmission orientation of the reflective linear polarizer 430. If the transmission orientation of the reflective linear polarizer 430 is zero degrees (i.e. aligned with the x-axis), then the transmission orientation of the reflective linear polarizer 440 is aligned to −45 degrees (would transmit light polarized at −45 degrees or 135 degrees).

A polarization of the light 465 is rotated again by +45 degrees by the Faraday rotator 420 to form light 470. The light 470 is incident on the reflective linear polarizer 430. The reflective linear polarizer 430 reflects the light 470 as light 475, because the polarization of the light 470 is orthogonal to its transmission orientation.

A polarization of the light 475 is rotated again by +45 degrees by the Faraday rotator 420 to form light 480. The light 480 has a linear polarization that has been rotated 135 degrees relative to the linear polarization of the light 455.

The light 480 is incident on the reflective linear polarizer 440. The reflective linear polarizer 440 transmits the light 480 as light 485, because the polarization of the light 480 is parallel to its transmission orientation.

Light propagating through the folded optical system 410, thus, undergoes multiple reflections between the reflective linear polarizer 430 and the reflective linear polarizer 440. In general image light that enters the folded optical system 410 is reflected by the reflective linear polarizer 440 back toward the Faraday rotator 420 once before transmitting the image light to the panoramic lens 240. Moreover, orientations of the reflective linear polarizers 430 and/or 440 and an amount of rotation caused by the Faraday rotator 420 may be different than those described above—so long as at the image light is reflected at least one time within the folded optical system 410 prior to exiting towards the panoramic lens 240. The folded optical system 410 reduces a spacing between the projection lens 230 and the panoramic lens 240, thereby reducing form factor of the display assembly. Moreover, assuming proper alignment, the folded optical system 410 may be very efficient relative the folded optical system 310. Note that the folded optical system 310 includes the mirrored surface 350 which is partial reflector—accordingly, light is lost each time the light reflects from that surface.

Note that a folded optical system (e.g., 310 and/or 410) acts to separate optical elements that create a folded optical path from the projection lens 230 and the panoramic lens 240. The separation of optical elements provides a clear functionality of different parts of a display assembly (e.g., 200, 300, and/or 400) can simplify design analysis, metrology, and/or manufacturability.

Figure 5:
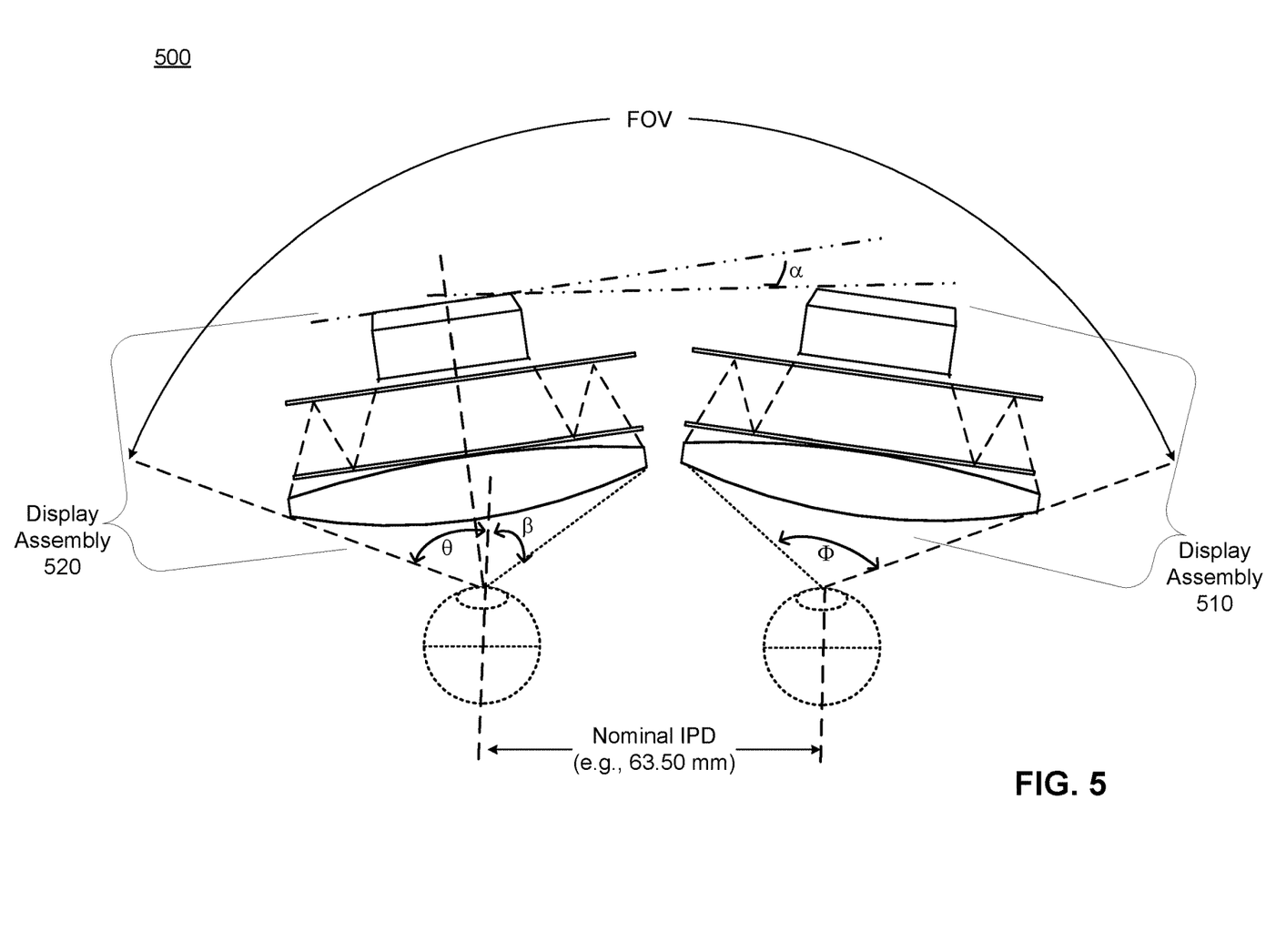
FIG. 5 is an example of a top down view of a portion of a headset including display assemblies in a canted configuration, in accordance with one or more embodiments.

FIG. 5 is an example of a top down view 500 of a portion of a headset including display assemblies in a canted configuration, in accordance with one or more embodiments. The headset may be, e.g., the headset 100. The headset includes a display assembly 510 and a display assembly 520. The display assemblies 510 and 520 are embodiments of the display assembly 300. In other embodiments, the display assemblies 510 and 520 may be embodiments of the display assembly 200 and/or 400.

Each of the display assemblies 510, 520 have an associated field of view, Φ. Theta may also be described in terms of a sum of two angles θ and β. Where β describes a portion of the field of view associated with nosal side viewing, and θ describes a portion of the field of view associated with temple side viewing. Nosal side viewing (side toward the nose) does not have to be as wide as temple side (side looking away from the nose) viewing. For example, if the field of view, Φ, is 70 degrees, θ may be 40 degrees and β may be 30 degrees. Accordingly, canting the display assemblies 510, 510 such that allows an increase in a combined field of view relative to non-canted configuration.

In the illustrated embodiment, each of the display assemblies 510, 520 are canted relative to each other. The display assembly 510 is canted at an angle, α, relative to the display assembly 520. The angle, α, is chosen to increase a field of view of the headset. For example, α may be at least 5 degrees. Note that the angle, α, is such that the display assembly 510 and the display assembly 520 have a first combined field of view, FOV, that is larger than a second combined field of view the display assembly 510 and the display assembly 520 would have in a non-canted configuration (i.e., α is zero). In some instances, the combined FOV may be at least 140 degrees.

Example of an Artificial Reality System

Figure 6:
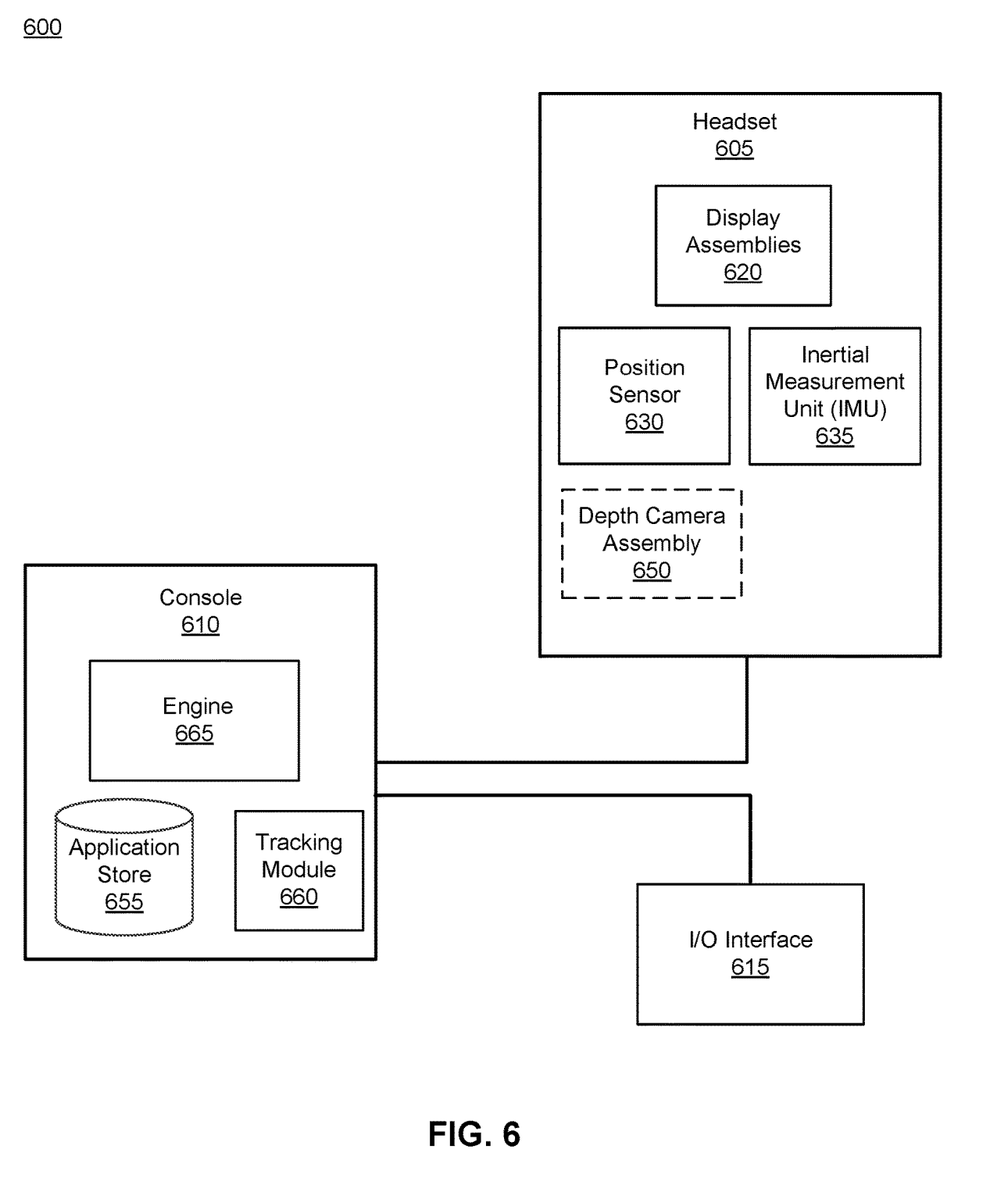
FIG. 6 is a block diagram of an example artificial reality system, in accordance with one or more embodiments.

FIG. 6 is a block diagram of an artificial reality system 600, according to one or more embodiments. The system 600 may operate in e.g., a VR system environment, an AR system environment, a MR system environment, or some combination thereof. The system 600 shown by FIG. 6 comprises a headset 605, a console 610, and an input/output (I/O) interface 615. While FIG. 6 shows an example system 600 including one headset 605 and on I/O interface 615, in other embodiments any number of these components may be included in the system 600. For example, there may be multiple headsets 605 each having an associated I/O interface 615, with each headset 605 and I/O interface 615 communicating with the console 610. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the headset 605.

The headset 605 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 605, the console 610, or both, and presents audio data based on the audio information. An embodiment of the headset 605 is the headset 100 described above in conjunction with FIGS. 1A and 1B.

The headset 605 includes a display assembly 620. The headset may also include one or more position sensors 630, an inertial measurement unit (IMU) 635, and an optional depth camera assembly (DCA) 650. Some embodiments of the headset 605 have different components than those described in conjunction with FIG. 6. Additionally, the functionality provided by various components described in conjunction with FIG. 6 may be differently distributed among the components of the headset 605 in other embodiments.

The display assemblies 620 presents content to the user. The display assemblies 620 includes a display assembly for each eye, and each display assembly is an embodiment of the display assembly 200, and are discussed in detail above with regard to FIGS. 2-4B. Each display assembly includes a projection lens and a panoramic lens that together provide a high resolution image over a wide field of view to a user of the headset 605. Additionally, in some embodiments, one or both of the display assemblies include folded optical systems (e.g., to reduce form factor). And in some embodiments, the display assemblies may be canted relative to each other to increase a field of view of the display assemblies 620.

The IMU 635 is an electronic device that generates data indicating a position of the headset 605 based on measurement signals received from one or more of the position sensors 630 and from the depth information received from the DCA 650. A position sensor 630 generates one or more measurement signals in response to motion of the headset 605. Examples of position sensor 630 include: one or more accelerometers, one or more gyroscopes, one or more magnetometers, another suitable type of sensor that detects motion, a type of sensor used for error correction of the IMU 635, or some combination thereof. The position sensor 630 may be located external to the IMU 635, internal to the IMU 635, or some combination thereof.

Based on the one or more measurement signals from one or more position sensor 630, the IMU 635 generates data indicating an estimated current position of the headset 605 relative to an initial position of the headset 605. For example, the position sensor 630 include multiple accelerometers to measure translational motion (forward/back, up/down, left/right) and multiple gyroscopes to measure rotational motion (e.g., pitch, yaw, roll). In some embodiments, the IMU 635 rapidly samples the measurement signals and calculates the estimated current position of the headset 605 from the sampled data. For example, the IMU 635 integrates the measurement signals received from the accelerometers over time to estimate a velocity vector and integrates the velocity vector over time to determine an estimated current position of a reference point on the headset 605. Alternatively, the IMU 635 provides the sampled measurement signals to the console 610, which interprets the data to reduce error. The reference point is a point that may be used to describe the position of the headset 605. The reference point may generally be defined as a point in space or a position related to the orientation and position of the headset 605.

In some embodiments, the headset 605 further includes the DCA 650. The DCA may be an embodiment of the DCA 115. The DCA 650 captures data describing depth information of the local area surrounding the headset 605. In embodiments not shown the DCA 650 is external to the headset 605 and captures images of the headset 605 within the local area. The DCA 650 uses one or more depth determination techniques to determine depth information. The depth determination techniques may include, e.g., structured light, stereo vision, time of flight, some other depth determination technique, or some combination thereof. The DCA 650 can compute the depth information using the data, or the DCA 650 can send this information to another device such as the console 610 that can determine the depth information using data from the DCA 650.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 635 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the headset 605 for processing in accordance with information received from one or more of: the DCA 650, the headset 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the headset 605 or the I/O interface 615. Examples of applications include: gaming applications, conferencing applications, video playback applications, or other suitable applications.

The tracking module 660 calibrates the system 600 using one or more calibration parameters and may adjust one or more calibration parameters to reduce error in determination of the position of the headset 605 or of the I/O interface 615. For example, the tracking module 660 communicates a calibration parameter to the DCA 650 to adjust the focus of the DCA 650 to more accurately determine positions of structured light elements captured by the DCA 650. Calibration performed by the tracking module 660 also accounts for information received from the IMU 635 in the headset 605 and/or an IMU 635 included in the I/O interface 615. Additionally, if tracking of the headset 605 is lost (e.g., the DCA 650 loses line of sight of at least a threshold number of structured light elements), the tracking module 660 may re-calibrate some or all of the system 600.

The tracking module 660 tracks movements of the headset 605 or of the I/O interface 615 using information from the DCA 650, the one or more position sensor 630, the IMU 635 or some combination thereof. For example, the tracking module 660 determines a position of a reference point of the headset 605 in a mapping of a local area based on information from the headset 605. The tracking module 660 may also determine positions of the reference point of the headset 605 or a reference point of the I/O interface 615 using data indicating a position of the headset 605 from the IMU 635 or using data indicating a position of the I/O interface 615 from an IMU 635 included in the I/O interface 615, respectively. Additionally, in some embodiments, the tracking module 660 may use portions of data indicating a position or the headset 605 from the IMU 635 as well as representations of the local area from the DCA 650 to predict a future location of the headset 605. The tracking module 660 provides the estimated or predicted future position of the headset 605 and/or the I/O interface 615 to the engine 665.

In some embodiments, the engine 665 generates a three-dimensional mapping of the area surrounding the headset 605 (i.e., the "local area") based on information received from the headset 605. In some embodiments, the engine 665 determines depth information for the three-dimensional mapping of the local area based on information received from the DCA 650 that is relevant for techniques used in computing depth. The engine 665 may calculate depth information using one or more techniques in computing depth from the portion of the reflected light detected by the DCA 650, such as stereo based techniques, the structured light illumination technique, and the time-of-flight technique. In various embodiments, the engine 665 uses the depth information to, e.g., update a model of the local area, and generate content based in part on the updated model.

The engine 665 also executes applications within the system 600 and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the headset 605 or haptic feedback via the I/O interface 615.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
   a display element including a plurality of pixels that together form an emission area, the emission area configured to emit image light;
   an optics block configured to direct the image light to an eyebox, the optics block comprising:
      a projection lens that is adjacent to the display element and is configured to receive the image light from the display element, the projection lens having a first diameter that is at least as large as a diameter of the emission area of the display element, and
      a panoramic lens positioned between the projection lens and the eyebox, wherein the panoramic lens has a second diameter that is larger than the first diameter, and is configured to provide the image light that has been transmitted by the projection lens to the eyebox.

2. The headset of claim 1, further comprising:
   a folded optical system positioned between the projection lens and the panoramic lens and a distance from the eyebox to the display element is no more than 25 mm.

3. The headset of claim 1, further comprising:
   a folded optical system between the projection lens and the panoramic lens, the folded optical system comprising:
      a first reflective linear polarizer that is positioned to receive the image light from the projection lens,
      a second reflective linear polarizer configured to output the image light to the panoramic lens, and
      a Faraday rotator positioned between the first reflective linear polarizer and the second reflective linear polarizer,
      wherein the image light is reflected by the second reflective linear polarizer back toward the Faraday rotator once before transmitting the image light to the panoramic lens.

4. The headset of claim 3, wherein at least one of the first reflective polarizer and the second reflective polarizer is a wire grid polarizer.

5. The headset of claim 3, wherein the folded optical system does not adjust an optical power of the optics block.

6. The headset of claim 1, further comprising:
   a folded optical system between the projection lens and the panoramic lens, the folded optical system comprising:
      a first quarter waveplate positioned to receive light from the projection lens,
      a mirrored surface that is adjacent to the first quarter waveplate,
      a second quarter waveplate that is closer to the eyebox than the mirrored surface, and
      a reflective polarizer that provides the image light to the eyebox, wherein the image light is reflected by the reflective polarizer back toward the mirrored surface once before transmitting the image light to the panoramic lens.

7. The headset of claim 1, wherein the projection lens is directly coupled to the display element.

8. The headset of claim 1, wherein a distance from the eyebox to the display element is no more than 50 mm.

9. The headset of claim 1, wherein a display assembly that includes the display and the optics block provides a field of view of at least 70 degrees to an eye of a user.

10. The headset of claim 1, wherein the optics block and the display element form a first display assembly that presents the image light to the eyebox, the headset further comprising:
    a second display assembly that presents second image light to a second eyebox, the second display assembly comprising:
       a second display element including a second plurality of pixels that together form a second emission area, the second emission area configured to emit the second image light;
       a second optics block configured to direct the second image light to the second eyebox, the second optics block comprising:
          a second projection lens that is adjacent to the second display element and is configured to receive the second image light from the second display element, the second projection lens having a third diameter that is at least as large as a diameter of the second emission area, and
          a second panoramic lens positioned between the second projection lens and the second eyebox, wherein the second panoramic lens has a fourth diameter that is larger than the third diameter, and is configured to provide the second image light that has been transmitted by the second projection lens to the second eyebox,
    wherein the first display assembly is at an angle relative to the second display assembly, and the angle is such that the first display assembly and the second display assembly have a first combined field of view that is larger than a second combined field of view the first display assembly and the second display assembly would have in a non-canted configuration.

11. A headset comprising:
an optics block configured to direct image light to an eyebox, the optics block comprising:
  a projection lens that receives the image light and has a first diameter that is at least as large as a diameter of an emission area of a display element, wherein the display element includes a plurality of pixels that together form the emission area, and
  a panoramic lens positioned between the projection lens and the eyebox, wherein the panoramic lens has a second diameter that is larger than the first diameter.

12. The headset of claim 11, further comprising:
a folded optical system positioned between the projection lens and the panoramic lens and a distance from the eyebox to a display element that generates the image light is no more than 25 mm.

13. The headset of claim 11, further comprising:
a folded optical system between the projection lens and the panoramic lens, the folded optical system comprising:
  a first reflective linear polarizer positioned to receive light from the projection lens,
  a second reflective linear polarizer configured to output the image light to the panoramic lens, and
  a Faraday rotator positioned between the first reflective linear polarizer and the second reflective linear polarizer,
  wherein the image light is reflected by the second reflective linear polarizer back toward the Faraday rotator once before transmitting the image light to the panoramic lens.

14. The headset of claim 13, wherein at least one of the first reflective polarizer and the second reflective polarizer is a wire grid polarizer.

15. The headset of claim 13, wherein the folded optical system does not adjust an optical power of the optics block.

16. The headset of claim 11, further comprising:
a folded optical system between the projection lens and the panoramic lens, the folded optical system comprising:
  a first quarter waveplate positioned to receive light from the projection lens,
  a mirrored surface that is adjacent to the first quarter waveplate,
  a second quarter waveplate that is closer to the eyebox than the mirrored surface, and
  a reflective polarizer that provides the image light to the eyebox, wherein the image light is reflected by the reflective polarizer back toward the mirrored surface once before transmitting the image light to the panoramic lens.

17. The headset of claim 11, wherein the projection lens is directly coupled to a display element that generates the image light.

18. The headset of claim 11, wherein a distance from the eyebox to a display element that generates the image light is no more than 50 mm.

19. The headset of claim 11, wherein a display assembly that includes the display and the optics block provides a field of view of at least 70 degrees to an eye of a user.

20. The headset of claim 11, wherein the optics block is part of a first display assembly that presents the image light to the eyebox, the headset further comprising:
a second display assembly that presents second image light to a second eyebox, the second display assembly comprising:
  a second optics block configured to direct the second image light to the second eyebox, the second optics block comprising:
    a second projection lens that receives the second image light and has a third diameter that is at least as large as a diameter of a second emission area of a second display element, wherein the second display element includes a second plurality of pixels that together form the second emission area, and
    a second panoramic lens positioned between the second projection lens and the second eyebox, wherein the second panoramic lens has a fourth diameter that is larger than the third diameter,
wherein the first display assembly is at an angle relative to the second display assembly, and the angle is such that the first display assembly and the second display assembly have a first combined field of view that is larger than a second combined field of view the first display assembly and the second display assembly would have in a non-canted configuration.

21. The headset of claim 1, wherein the emission area has a diagonal that is at least 2 inches.

* * * * *

UNITED STATES PATENT AND TRADEMARK OFFICE
CERTIFICATE OF CORRECTION

PATENT NO. : 10,901,217 B1  
APPLICATION NO. : 16/240477  
DATED : January 26, 2021  
INVENTOR(S) : Yoon et al.

Page 1 of 1

It is certified that error appears in the above-identified patent and that said Letters Patent is hereby corrected as shown below:

On the Title Page

Item (58), in Column 2, under "Field of Classification Search", Line 2, below "2027/0123; G02B 2027/0178" insert -- USPC ................... 359/13 --.

In the Claims

In Column 14, in Claim 10, Line 67, after "view" insert -- that --.

In Column 16, in Claim 20, Line 42, after "view" insert -- that --.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*